March 7, 1967 E. HENRY-BIABAUD 3,307,662
HYDRAULICALLY OPERATED CLUTCH AND MOTOR CONTROLS FOR VEHICLES
Filed Feb. 24, 1965 2 Sheets-Sheet 1
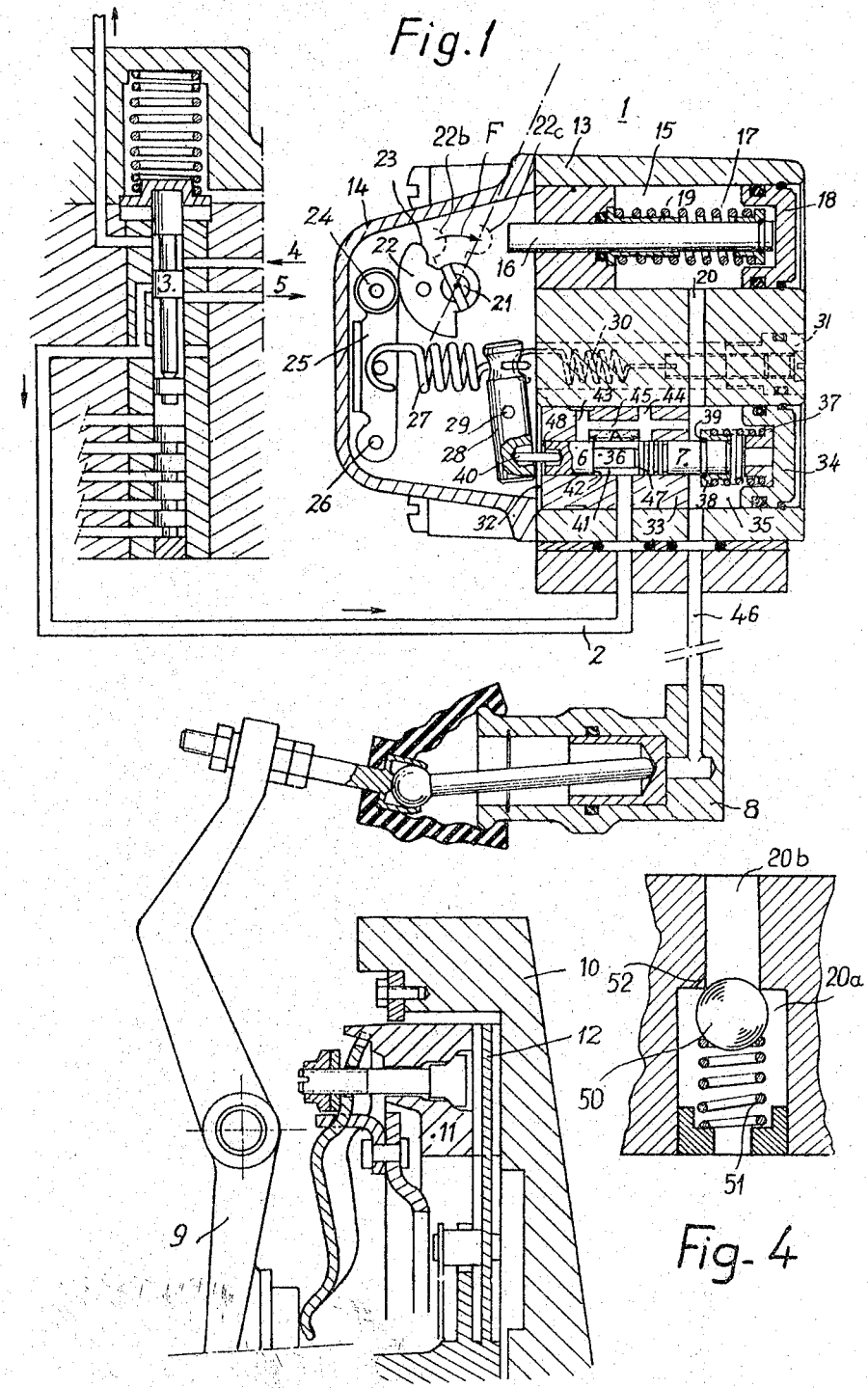

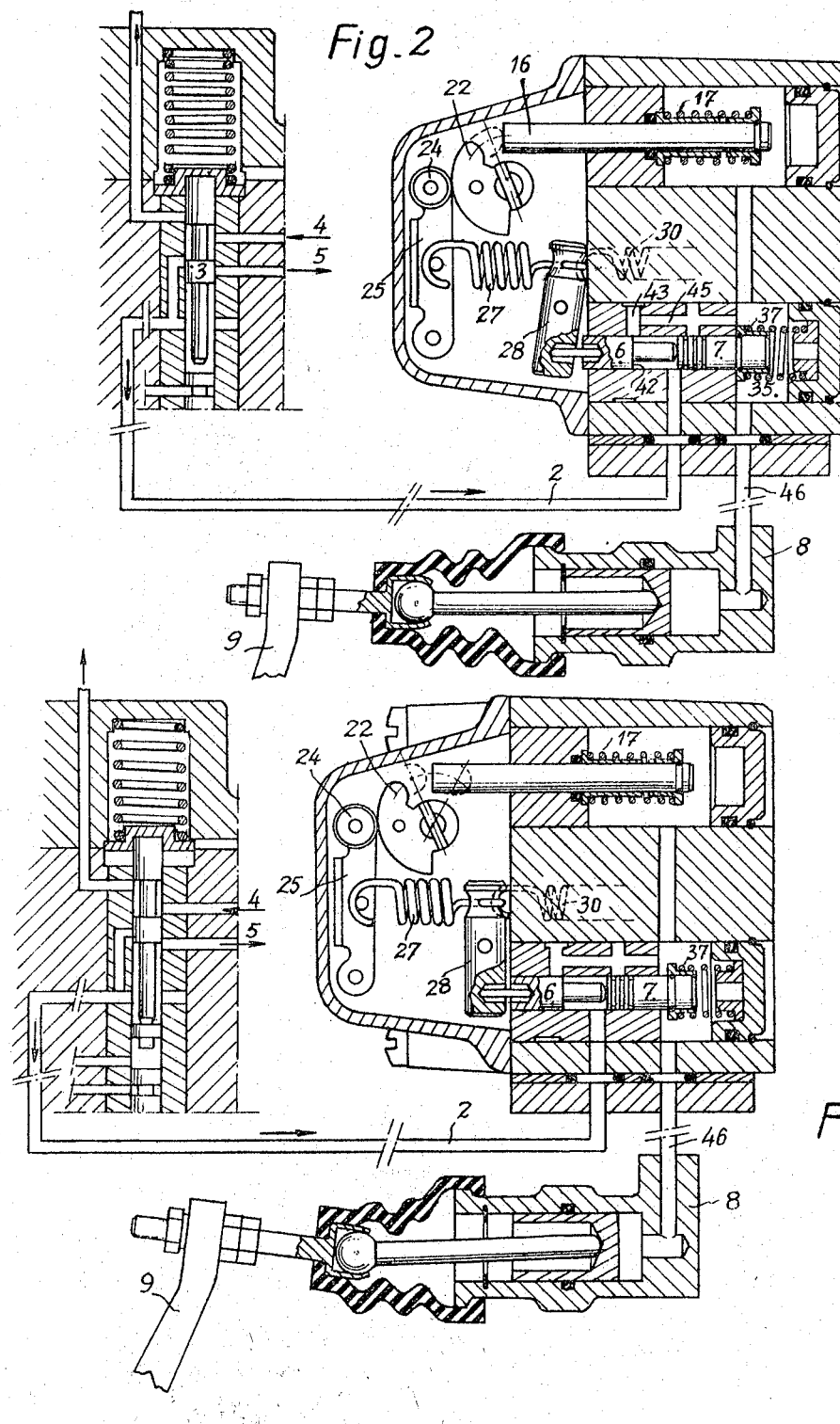

United States Patent Office 3,307,662
Patented Mar. 7, 1967

3,307,662
HYDRAULICALLY OPERATED CLUTCH AND
MOTOR CONTROLS FOR VEHICLES
Edmond Henry-Biabaud, Paris, France, assignor to Societe
Anonyme Andre Citroen, Paris, France, a corporation
of France
Filed Feb. 24, 1965, Ser. No. 434,988
Claims priority, application France, Feb. 28, 1964,
965,617, Patent 1,395,039
5 Claims. (Cl. 192—.076)

Hydraulically-operated clutch control devices for automobile vehicles are already known, which are intended to produce the desirable progression of the operations of disengagement and re-engagement of the clutch, especially the latter.

The present invention has for its object an improvement in this kind of control device intended to produce, at the moment of re-engagement, first of all a rapid exhaust of the liquid contained in the actuating cylinder of the clutch until a small driving torque is obtained, after which the exhaust is slower and more gradual, so that the engagement of the clutch is effected without disagreeable shocks or excessive slip.

The invention is also and more particularly directed to an arrangement in which the value of this torque, starting from which the progressive action of the clutch is obtained depends on the position of the butterfly-valve of the accelerator, so as to obtain an accurate control of the re-engagement pressure; the resulting re-engagement torque should be greater as the driving torque demanded by the accelerator pedal is itself greater.

The advantages and also the characteristic features of the invention will be brought out more clearly from the description which follows below of one form of embodiment shown by way of example in the accompanying drawings, in which:

FIG. 1 is a diagrammatic cross-secton of a clutch control device according to the invention, in the engaged position;

FIG. 2 shows the same cross-section for the disengaged position of the clutch;

FIG. 3 shows this same cross-section for the re-engaged position of the clutch;

FIG. 4 is a view of a detail of construction.

As shown in FIG. 1, the clutch control device, hereinafter known by the name of a "corrector" is shown generally at 1. It communicates by a conduit 2 with an operating and speed-selecting slide-valve 3 actuated either directly by the driver of the vehicle or automatically by governor devices, and which, amongst other functions, put the conduit 2 in connection either with a source of liquid under pressure through a conduit 4, or with the tank through a conduit 5.

The corrector controls the passage of the liquid by an arrangement of valves 6, 7 between the slide-valve 3 and a power cylinder 8. The latter acts through a suitable lever system 9 on a clutch device 10 of conventional type, comprising a moving plate 11 urged by springs towards the disc 12 rigidly fixed to the driving shaft.

The corrector itself is composed of a body 13 closed by a casing 14. In the body 13 is formed a chamber 15, in which slides a piston 16 held at rest by a spring 17 in abutment against a plug 18. A spacing member 19 is provided to limit the movement of the piston under the influence of the pressure of the liquid which comes into the chamber 15 through a conduit 20. The casing 14 is traversed perpendicular to the piston 16 by a shaft 21 fixed for rotation with the spindle of the butterfly-valve of the carburettor or other device which regulates the feed of fuel to the engine. This shaft 21 carries a cam 22 provided with a finger 23 intended to co-operate with the piston 16, the latter constituting a stop for limiting the rotation of the cam.

The periphery of the cam is determined in dependence on the characteristics of the engine and the carburettor, and also on the progressiveness of the clutch. In practice, it is a curve of decreasing radius similar to that of the driving torque. Against the cam profile is applied a roller 24 mounted on a lever 25 which is pivoted at 26. On this lever is hooked a spring 27, the other extremity of which is fixed on a lever 28 pivoted at its central portion about a spindle 29.

The tension of the spring 27 is adjustable by an opposing spring 30 and by an adjustable screw 31.

The body 13 of the corrector comprises a bore 32 provided with a jacket 33 and closed by a plug 34, forming a chamber 35. In a bore 48 of the sleeve 33 are slidably mounted the two cylindrical valves 6 and 7 spaced apart by a finger 36.

A spring 37 supported on the one hand against the plug 34 and on the other against the valve 7 through the intermediary of the ring 38 and the keeper ring 39, pushes the valve 7 against the valve 6 and the latter actuates a crank-arm 40 attached to the lever 28.

The conduit 2 opens into the bore of the sleeve 33 and into the interior of the space 41 formed by the faces 42 and 47 of the valves 6 and 7.

Into this bore also open two radial conduits 43 and 44 connected by an axial conduit 45 to the chamber 35. The distance A between the adjacent generator lines of the conduits 43 and 44 is slightly greater (for example by 0.3 mm.) than the distance separating the two opposite faces 42 and 47 of the valves 6 and 7. It is seen moreover that the conduit 46 connects the chamber 35 to the cylinder of the jack 8.

Finally, the adjustment of the piston 16 in the body 13 and of the valve 6 in the sleeve 33 is effected in such manner as to obtain perfect fluid-tightness ($2\mu$), whereas the valve 7 moves in the bore 48 with a well-defined clearance (13 to $15\mu$) creating a leakage of liquid.

The operation of this device is as follows:

Considering FIG. 1 which shows the apparatus in the "engaged" position, the position of the slide-valve 3 is such that the conduits 2 and 46 are at zero pressure, the conduit 2 communicating with the conduit 5 of the tank. The corrector is at rest and the piston of the power cylinder 8 is pushed into its cylinder by the pressure of the springs which compress the clutch.

When the slide-valve 3 is operated for a change of gear, the conduit 2 is put into communication with the conduit 4 of the source of pressure. The fluid under pressure passing through the conduits 43 and 44 reaches the chamber 35 in which it pushes the valves 6 and 7 outwards and tensions the spring 27, causing the lever 28 to pivot about the spindle 29. The fluid also passes into the chamber 15, in which it pushes the piston 16 towards the exterior. If the accelerator has been kept in the position of full throttle, the cam 22 is then located at 22c on the path of the piston 16 and the latter pushes it back to an intermediate position 22b (shown in dotted lines) at which the opening of the butterfly-valve of the carburettor and in consequence the speed of rotation of the engine, is limited to a pre-determined value, for example 4,000 r.p.m. (the position of the cam shown in full lines corresponds to the idling position).

The outward travel of the piston 16 is limited by the spacing member 19, as previously indicated.

The fluid also passes into the chamber 35 and through the conduit 46 to the power cylinder 8, at which it pushes back the piston and in consequence effects de-clutching.

It will be observed that in this position the valve 6 opens a large section of the conduit 43 (FIG. 2).

In the position of the device shown in FIG. 3, the slide-valve 3 has returned to a position in which the conduit again comunicates with the conduit 5 of the tank.

The exhaust of the fluid is effected abruptly by virtue of the large free section of the conduit 43, which permits the de-clutching cylinder to empty rapidly until a certain pressure is applied by the clutch springs. This pressure is set by the tension of the spring 27 which is controlled as a function of the position of the butterfly-valve sprindle by the cam 22. It can be seen that the more the butterfly is open and in consequence, the more the cam has rotated in the direction of the arrow F (FIG. 1), the less the cam stretches the spring so that for the maximum position of opening permitted by the piston 16, the total closure of the conduit 43 by the valve 6 will take place at a small value of residual pressure in the de-clutching cylinder, which corresponds to a greater pressure of the plate on the clutch disc. On the other hand, if the accelerator is not depressed, the cam 22 applies a greater force on the spring 27, the return of the valve 6 to the position of closure of the conduit 43 is thus effected at a residual pressure which is higher than before, and therefore with a lower pressure of the moving plate on the clutch disc.

Starting from the moment when the conduit 43 is completely closed, and at which there is thus rapidly obtained the torque permitting the drive of the vehicle wheels, the abrupt setting to exhaust is terminated and the emptying of the cylinder is effected by the leakage around the valve 7, the liquid then escaping from the conduit 44 towards the conduit 2. It will thus be noted that the movement of the valve 7 towards the left beyond the orifice is reduced during this entire period, that is to say at the same time as the pressure, which ensures the progressiveness of the re-engagement of the clutch.

It may be advantageous to provide in the conduit 20 which couples the chamber 35 to the chamber 15, a fluid flow restricting device to slow-down the rise in pressure and to render more progressive the eventual reduction of the fuel feed effected by the piston 16.

In accordance with the form of embodiment shown in FIG. 4, the device is formed by an enlargement 20a of the conduit 20, in which is housed a ball 50 pushed back by a spring 51 against the narrower portion 20b of the conduit, serving as a seating.

However, the conduit is not entirely closed since the seating is provided with a number of radial grooves 52 which create a pre-determined leakage.

During de-clutching, the liquid passes from the chamber 35 to the chamber 15 through the intermediary of these grooves in a longer time, and thus the eventual reduction of the fuel gases carried out by the piston 16 is less abrupt. During re-engagement of the clutch, the chamber 15 empties itself normally by lifting the ball.

What is claimed is:
1. A hydraulic clutch control device for an automobile vehicle comprising a fluid pressure power cylinder for operating the clutch, an operating and speed-selecting control slide-valve controlling a source of fluid-pressure, a corrector located between said power cylinder and said control slide-valve comprising a regulating slide-valve, members controlled by the spindle of the accelerator butterfly-valve controlling said regulating slide-valve to adapt the speed of re-clutching to the speed of the vehicle, a pivoted lever controlled by said members, a spring cooperating with said lever whose tension is a function of the position of said butterfly-valve spindle, said regulating slide-valve having a bore, a set of two spaced valves in said bore, one of said valves moving without clearance in said more and the other valve with a predetermined clearance to produce a leakage, said set subjected on one side to the fluid-pressure existing in said power cylinder and on the other side to the action of said lever, a connecting conduit connected by said control slide-valve to a source of high pressure or to a source of low pressure; a chamber located adjacent one of said set of valves, a conduit connecting said power cylinder with said chamber, an internal connection between said chamber and the space in said bore between said set of valves; said internal connection being closed by said valves after a first movement of the clutch and the final clutching movement being controlled by the leakage of fluid about said valve with a predetermined leakage.

2. A hydraulic clutch control device in accordance with claim 1 wherein said corrector comprises a second chamber communicating with said source of fluid-pressure, a piston extending out of said second chamber by a predetermined amount under the action of said fluid-pressure, a cam carried by the spindle of the butterfly-valve cooperating with said piston to limit or bring back to a predetermined value the opening of the carburetor butterfly-valve during the operation of de-clutching and re-engagement of the clutch.

3. A hydraulic clutch control device in accordance with claim 2 wherein said cam has a profile with a progressive radius against which is applied the extremity of said lever to adjust said spring acting on said lever, the profile of said cam being such that said spring has a uniformly-increasing tension with respect to the driving torque.

4. A hydraulic clutch control device in accordance with claim 3, wherein an opposing spring enables the value of the tension of said spring acting on said set of valves to be regulated manually.

5. A hydraulic clutch control device in accordance with claim 4, wherein said conduit connecting said chamber with said power cylinder contains a fluid flow restricting device.

References Cited by the Examiner

UNITED STATES PATENTS

| | | | |
|---|---|---|---|
| 2,080,487 | 5/1937 | Kettering | 192—.076 |
| 2,156,305 | 5/1939 | Price | 192—.075 |
| 2,184,616 | 12/1939 | Hill | 192—.075 |
| 2,732,048 | 1/1956 | Forster | 192—.075 X |
| 3,066,776 | 12/1962 | Hefel et al. | 192—91 X |

DAVID J. WILLIAMOWSKY, *Primary Examiner.*

BENJAMIN W. WYCHE, *Examiner.*